United States Patent [19]

Pray et al.

[11] 3,950,650

[45] Apr. 13, 1976

[54] INK CURING AND DRYING APPARATUS

[75] Inventors: Robert W. Pray, Greenwich; Ralph L. Foster, Darien, both of Conn.

[73] Assignee: Thermogenics of New York, Inc., Byram, Conn.

[22] Filed: Jan. 15, 1975

[21] Appl. No.: 541,149

Related U.S. Application Data

[60] Continuation-in-part of Ser. No. 454,402, March 25, 1974, Pat. No. 3,894,343, which is a division of Ser. No. 263,250, June 15, 1972, Pat. No. 3,829,982.

[52] U.S. Cl. .................... 250/504; 34/4; 240/103 B

[51] Int. Cl.[2] ...... F21V 7/00; F26B 3/28; G01J 1/00

[58] Field of Search ........ 240/103 B; 250/504; 34/1, 34/49, 4

[56] References Cited

UNITED STATES PATENTS

| | | | |
|---|---|---|---|
| 3,588,492 | 6/1971 | Pollock | 240/103 B |
| 3,733,709 | 5/1973 | Bassemir et al. | 34/1 |
| 3,894,343 | 7/1975 | Pray et al. | 34/4 |

*Primary Examiner*—Alfred E. Smith
*Assistant Examiner*—T. N. Grigsby
*Attorney, Agent, or Firm*—Eugene E. Geoffrey, Jr.

[57] ABSTRACT

Curing and drying apparatus for printing inks which includes a housing having openings for passing a printed web therethrough and lamp assemblies each including a shell, a reflector and an ultraviolet light lamp or radiator for focusing radiation onto said web. Blowers are coupled to said housing for feeding air about the back side of said reflectors and about the sockets for the lamps to remove excess heat and novel and improved means are provided for protecting said lamps and major portions of the lamp necks from said cooling air to prevent lowering the temperature and therefore the efficiency of the lamps.

1 Claim, 6 Drawing Figures

INK CURING AND DRYING APPARATUS

Figure 1:
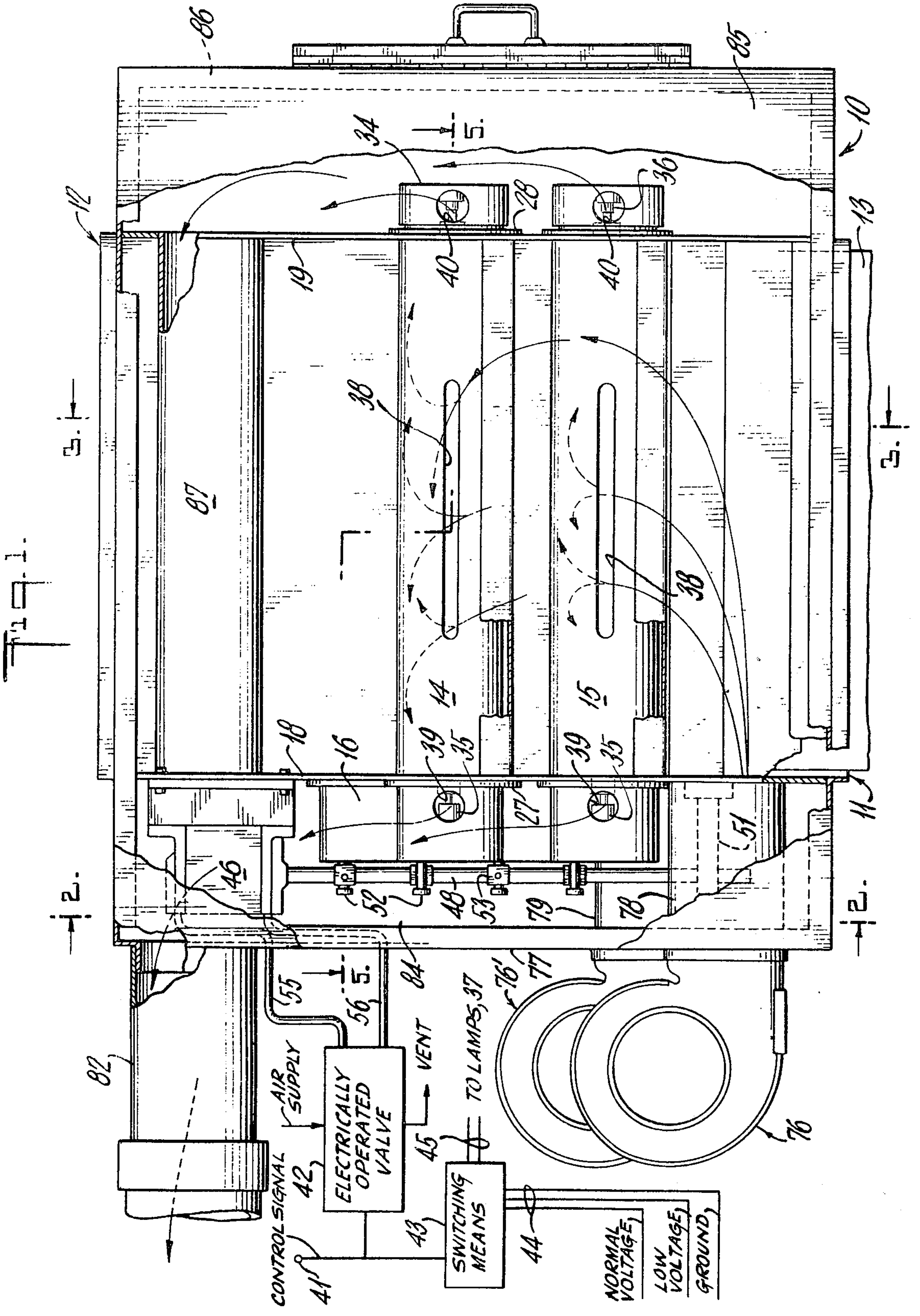

This is a continuation-in-part of application Ser. No. 454,402, filed Mar. 25, 1974 and now U.S. Pat. No. 3,894,343 and which is a division of application Ser. No. 263,250, filed June 15, 1972 and now U.S. Pat. No. 3,829,982, granted Aug. 20, 1974.

This invention relates to ink drying and curing apparatus for printing presses and more specifically to a novel and improved air cooling means for ultraviolet lamps in ink drying systems useful among other things for offset presses of both single color and multi-color types.

With the development of printing inks and other coatings which may be rapidly cured and dried by relatively high intensity ultraviolet radiation, apparatus for the production of high intensity ultraviolet radiation has been suggested utilizing, among other devices, high intensity mercury lamps. While mercury lamps which utilize a high intensity arc to evaporate mercury within a sealed envelope have been found most effective for generating ultraviolet light, they present certain problems, particularly when used in connection with printing presses. One of the basic difficulties is encountered in stopping a press since the ultraviolet radiation will immediately burn the web which is normally paper or other similar material that is readily damaged by excessive radiation. While the use of shutters and partitions have been suggested, they have not been found particularly effective to prevent damage to the printed web since the lamps must continue to be energized at least to 50% of their intensity if the web is to be halted only momentarily. This is necessary since five to ten minutes are required to restart a lamp once the arc has been extinguished. Furthermore, shutters and partitions will absorb substantial energy so that the time during which the shutters would be effective before re-radiating heat of sufficient magnitude to burn the printed web is materially limited.

This invention overcomes the difficulties heretofore encountered and provides a novel and improved device particularly adaptable for use in rapidly curing and drying printing inks and wherein the printed web may be stopped for an indefinite period while the ultraviolet lamps are energized and without adversely affecting the lamps or web in any way. This is attained through a novel and improved arrangement and organization of elements including improved air cooling means for removing heat from the reflector and sockets and without adversely affecting operation of the lamp.

Still another object of the invention resides in the provision of irradiating apparatus utilizing high intensity lamps and improved cooling means for curing and drying printed and coated surfaces and which includes energy absorbing chambers for receiving and dissipating radiant energy of said lamps when it is desired to terminate irradiation of the printed or coated surfaces without deenergizing the lamps.

A further object of the invention resides in the provision of novel and improved ink drying and curing apparatus embodying high intensity ultraviolet lamps and reflectors and air cooling means for cooling both the reflectors and the electrical connectors for the lamps without permitting circulation of air over the lamp envelopes.

A still further object of the invention resides in the provision of a novel and improved ultraviolet radiator for drying and curing printing inks and coatings.

The objects of the invention are attained by the provision of a housing having elongated cylindrical tubes or shells rotatably disposed therein. A longitudinal portion of each tube is open to receive a reflector and an ultraviolet energy source and the housing has openings to permit a web to be treated to pass therethrough. The cylindrical tubes are rotatable from one position to direct radiation onto the web and to another position wherein the open portion of each tube is closed by an energy absorbing chamber. The housing and tubes have openings for the circulation of air through the housing, through the tubes and about the reflectors, and about the energy absorbing chambers to cool the housing, tubes, chambers and lamp terminals while, at the same time, permitting the energy sources to remain at a normal operating temperature.

The above and other objects and advantages of the invention will be more clearly understood from the following description and accompanying drawings forming part of this application.

Figure 4:
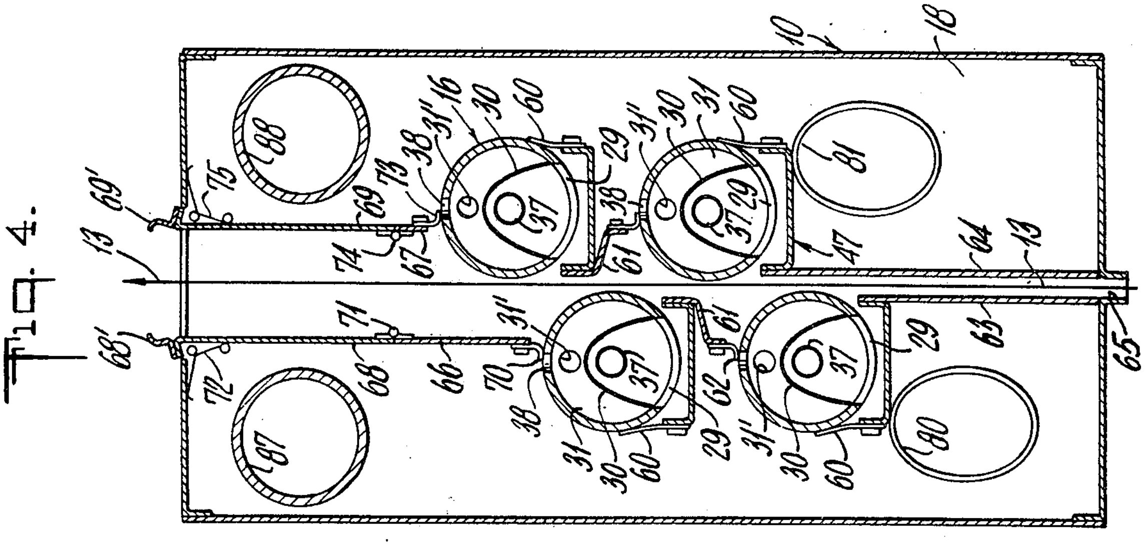
Figure 3:
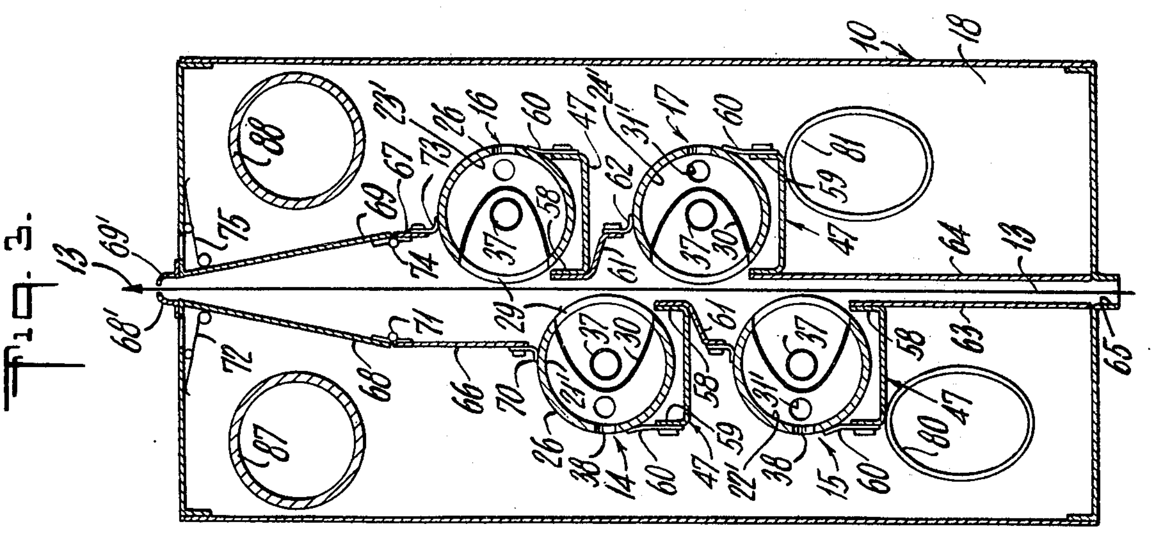
Figure 2:
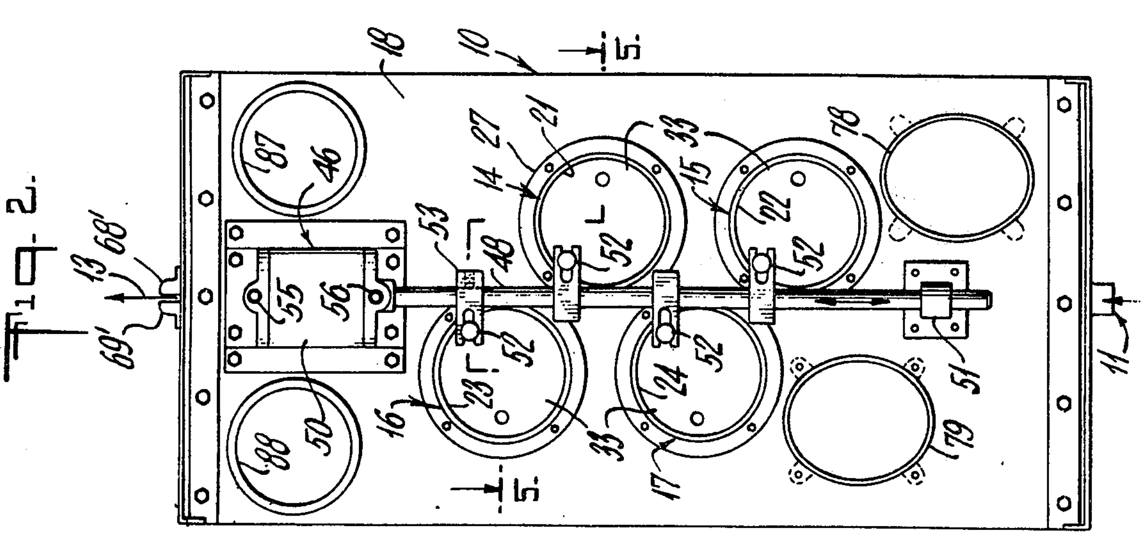
Figure 5:
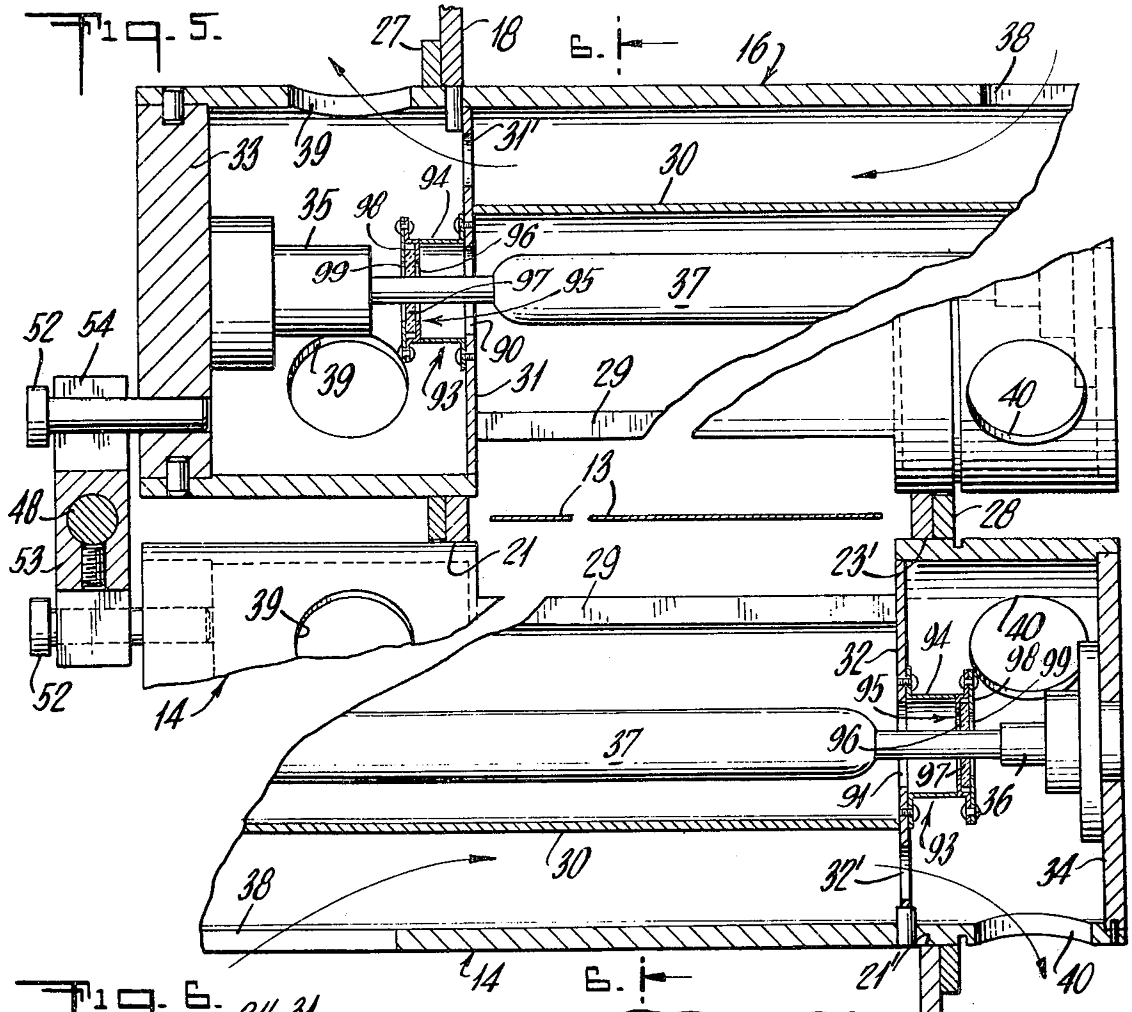
Figure 6:
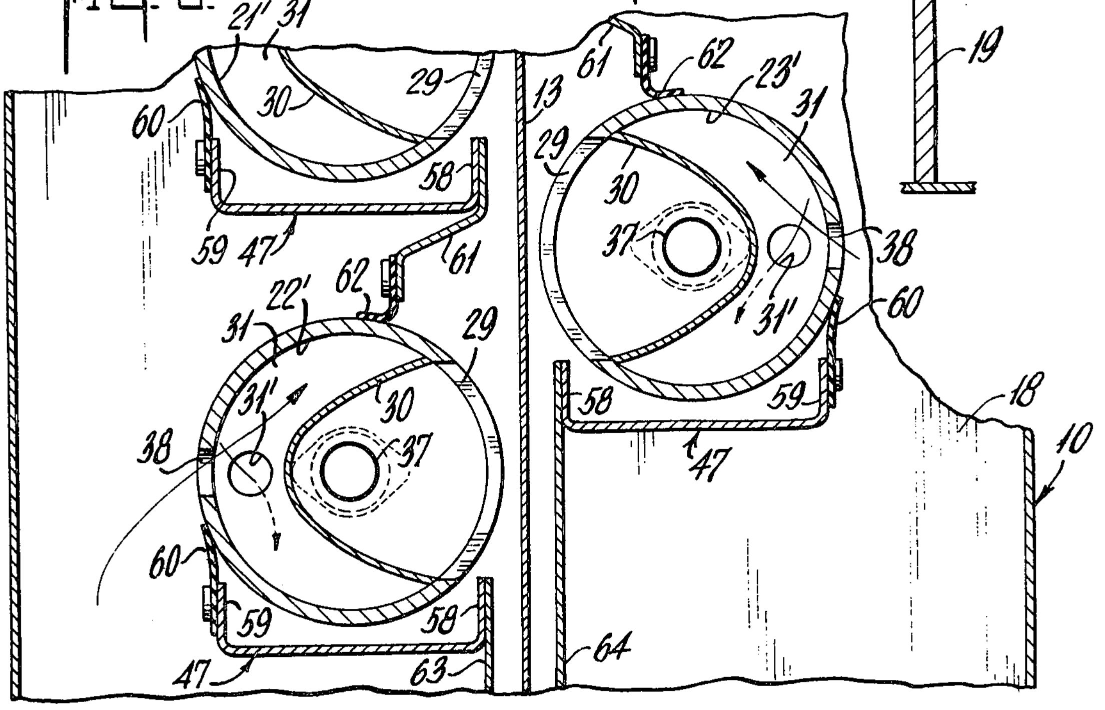

In the Drawings:

FIG. 1 is a side elevational view with parts broken away of one embodiment of drying and curing apparatus in accordance with the invention, FIGS. 2 and 3 are cross-sectional views of FIG. 1 taken along the lines 2—2 and 3—3 thereof, FIG. 4 is a view similar to FIG. 3 with the cylindrical tubes or shells rotated away from the web being treated, FIG. 5 is a cross-sectional view of FIG. 1 taken along the line 5—5 thereof and with parts broken away, and FIG. 6 is a cross-sectional view of FIG. 5 taken along the line 6—6 thereof.

Referring now to the drawings, the drying apparatus is enclosed within a housing generally denoted by the numeral 10 having a web inlet 11 and a web outlet 12. The web is denoted by the numeral 13 and moves vertically through the housing. As will become apparent, the housing 10 may be positioned so that the web traverses the housing horizontally or at any angle of inclination.

In the instant embodiment of the invention, four ultraviolet lamp assemblies generally denoted by the numerals 14, 15, 16 and 17 are utilized for simultaneously curing ink on each side of the web though it is evident that any desired number of lamps on one or both sides may be employed depending on the speed of the web and whether one or both sides are to be treated.

The lamp assemblies 14 through 17 are supported by transverse partitions 18 and 19 disposed within the housing 10 and spaced apart a distance slightly greater than the width of the web. The partitions 18 and 19 each include four openings, 21 through 25 in partition 18 and 21' through 25' in partition 19, for rotatably supporting the lamp assemblies on each side of the web 13. More specifically, the lamp assemblies which are generally of tubular configuration are arranged with the assemblies 14 and 15 on the left side of the web 13 as viewed in FIGS. 3 and 4, while the assemblies 16 and 17 are on the right side of the web and displaced upwardly therefrom so that radiation from two opposing lamp assemblies is not directed simultaneously on the same portion of the web. Inasmuch as the four lamp assemblies are identical in structure and mounted in a similar manner, only one lamp assembly will be described.

The lamp assembly 14 includes a tubular shell 26 which extends through the openings 21 and 21' in the partitions 18 and 19 respectively. The shell is rotatably sealed in the openings by light-tight rings 27 and 28 of a suitable high temperature plastic or metal. As will be described, each lamp assembly is rotatable through an angle of 90° and, accordingly, suitable means are provided to limit rotation as well as longitudinal displacement. The shell 26 has a longitudinal opening 29 of substantial arcuate width and length slightly greater than the width of the web. A curved reflector 30 of suitable hypobolic or other curvature is disposed within the shell 26 and with the edges of the reflector coincident with the edges of the longitudinal opening 29. The ends of the reflector are closed by annular plates 31 and 32 having openings 31' and 32' respectively communicating with the back side of the reflector.

The ends of the shell 26 are closed by plates 33 and 34 each of which carry electrical sockets 35 and 36 respectively for the ultraviolet radiation lamp 37. The sockets are positioned in such a manner that the lamp 37 will be disposed in proper relationship to the reflector in order to focus the radiation on the web with a beam width at the point of impingement preferably being of the order of one quarter inch. The shell is further provided with an elongated opening 38 and the ends of the shells which extend through the partitions 18 and 19 are provided with openings 39 and 40. The plates 33 and 34 on the ends of the shells 26 are removably secured in position to facilitate servicing and maintenance.

Because of the high intensity radiation emitted by the lamps 37 and the concentration of the radiation on an exceedingly narrow strip across the web, the web will be quickly burned should the press speed be materially decreased or the press be stopped for any reason whatsoever. While the lamps can be deenergized, even momentary deenergization would require at least five to ten minutes for restarting with the result that substantial press-time would be lost. To avoid deenergization of the lamps 37 should the press speed be reduced, a suitable control signal is applied to the terminal 41 which is fed to an electrically operated valve 42 and to switching means 43. The switching means 43 is supplied via conductors 44 with a normal operating voltage for the lamps 37 and a low operating voltage, and the conductors 45 are connected to the lamps 37. The actual electrical connections have been omitted in order to avoid unnecessary complication of the drawings. When the press speed is reduced to approximately 25% of its normal speed, switching means 43 is actuated to switch the lamps 37 to the low voltage source which functions to operate the lamps at approximately one-half of the normal power output. Under these conditions, since the web 13 continues to move through the dryer 10, the intensity of the radiation from the lamps 37 is insufficient to damage the web but will effect curing of the ink on the printed web.

If the printing press is completely stopped or its speed falls below 25% of its normal speed, the control signal 41 will operate the electrically operated valve 42 and thereby actuate a pneumatically operated control 46 which effects rotation of the shells 26 from the positions shown in FIG. 3 to the positions shown in FIG. 4 so that the radiation emitted by the lamps 37 is directed into energy absorbing chambers 47. The pneumatically operated device 46 is carried by the partition 18 and has a shaft 48 pivoted at 49 to a piston disposed within the cylinder 50 and the lower end of the shaft 49 slidably engages a cooperating opening in a fixed support 51 also carried by the partition 18. The end plates 33 of the shells 26 each carry a stud 52 fixedly secured thereto. Each stud 52 engages a bracket or dog 53 fixed to the shaft 48 and having a slot 54 slidably engaging pin 52. With the piston in the retracted position as shown in FIG. 2, the reflectors iin the shells are directed toward the web 13 as shown in FIG. 3. When air pressure is applied to the upper conduit 55 of the pneumatic device 46 and the lower conduit 56 is vented to the air by reason of the operation of the electrically operated valve 42, the shaft 48 will move downwardly to rotate the shells 26 to the position shown in FIG. 4. At the same time, the control 43 reduces the intensity of the lamps 37 to approximately 50% of their normal operating power. Immediately upon restarting the press and its attainment of a speed in excess of 25% of its normal speed, the shells 26 are rotated to the position shown in FIG. 3 and normal voltage is applied to the lamps.

The energy absorbing chambers 47 are generally identical in structure and extend between and are supported by the partitions 18 and 19. Each chamber includes a bottom wall 57 and upwardly extending side walls 58 and 59. The upper edges of the side walls 58 and 59 are positioned as close as possible to the associated shell 26 so that the light and air leakage from the chambers 47 will be maintained at a minimum. To further minimize the leakage of air from those portions of the housing 10 surrounding the lamp assemblies 14 through 17 into the space between the lamp assemblies and the web, each leg 59 carries an elongated strip of flexible material 60 which rides against the outer surface of the associated shell 26. In addition, the legs 58 of the energy absorbing chambers 47 associated with the lamp assemblies 14 and 16 each carry a downwardly and outwardly extending bracket 61, each of which carries a piece of flexible material 62 on the outer end thereof which bears against the surface of the underlying lamp assemblies 15 and 17, as the case may be. The leg 58 of the energy absorbing chamber associated with the lamp assembly 15 has a downwardly extending wall 63 and the energy absorbing chamber 47 associated with the lamp assembly 17 has a similar wall 64 extending downwardly from the leg 58. The walls 63 and 64 are in closely spaced relationship and provide just sufficient clearance for the web 13 so that the latter will not touch the partitions 63 and 64 during normal operation of the associated press. The lower edges of the walls 63 and 64 are coincident with an elongated opening 65 in the bottom end of the housing 10 through which the web 13 enters the housing.

Light and air leakage above the lamp assemblies is prevented by walls or baffles 66, 67, 68 and 69. The baffle 66 is supported between the partitions 18 and 19 and has a flexible strip 70 extending throughout its length and bearing against the shell 26 of the lamp assembly 14. A wall or baffle 68 is hinged at 71 to the upper edge of the wall 66 and is movable from an operating position as shown in FIG. 3 to an open position as shown in FIG. 4. The open and closed positions are controlled by a spring 72. Similarly, the wall or baffle 67 also extends between the partitions 18 and 19 and has a flexible member 73 bearing against the outer surface of the shell 26 forming part of the lamp assembly 16. The wall or baffle 69 is pivoted at 74 to the upper edge of the wall 67 and is movable from an operating position as shown in FIG. 3 to an open position as shown in FIG. 4 under the control of a spring 75. The upper ends of the baffles 68 and 69 are curved inwardly at 68' and 69' respectively to form an exceedingly narrow gap through which the web 13 may emerge from the housing 10. This procedure greatly minimizes light leakage from the housing 10 and it is important that such leakage be minimized because the radiation is high tensity ultraviolet light which has serious adverse effects on the human eye. To facilitate threading of the web through the housing however, the baffles 68 and 69 can be moved to the open position shown in FIG. 4.

Inasmuch as substantial heat is developed within the housing 10, a novel and improved system is provided for both removing the heat from the housing and for cooling the reflectors 30. The cooling system includes a pair of centrifugal or other suitable motor operated blowers 76 and 76'. The blowers are secured to the rear wall 77 of the housing 10 and are coupled by conduits 78 and 79 to openings 80 and 81 so that air from the blowers 76 and 76' is discharged into the spaces surrounding the lamp assemblies and bounded by the partitions 18 and 19. Exhaust conduit 82 as shown in FIG. 1 is also secured to an aligned with a cooperating opening in the rear wall 77 of the housing 10. The conduit 82 therefore communicates with the space 84 between the housing end wall 77 and the partition 18. The space 84 and the space 85 in the forward end of the housing between the partition 19 and the housing wall 86 are coupled by conduits 87 and 88 extending between and supported by partitions 18 and 19.

With the foregoing arrangement, air from the blowers 76 and 76' is fed through the conduits 78 and 79 into the spaces between the partitions 18 and 19 and the outer sides of the lamp assemblies 14 and 15 on one side of the web 13 and the outer sides of the lamp assemblies 16 and 17 on the other side of the web 13. In the case of the lamp assemblies 14 and 15, the air enters the slots or openings 38 as shown in FIG. 1 and travels in both directions over the back sides of the reflectors 30. Part of the air passes through the openings 31' in the plates 31 and is discharged through openings 39 and into the chamber 84. The remainder of the air flows through openings 32' in the plates 32 and is discharged through openings 40 into the chamber 85. The same air flow occurs in connection with the lamp assemblies 16 and 17. The air flowing into chamber 85 passes through conduits 87 and 88 into chamber 84 and all of the air in chamber 84 is exhausted through the conduit 82.

As pointed out above, it is important that the air does not contact and cool the envelopes of the lamps 37. This is accomplished by the structure previously described and shown in FIGS. 3 and 4. The air is directed through the openings 31' and 32' in plates 31 and 32 for the purpose of cooling the narrow neck portions 37' of the lamps 37 as well as the sockets 35 and 36 as may be observed more clearly in FIG. 5. Inasmuch as electrical connectors are secured to the neck portions 37', the openings 90 and 91 in the plates 31 and 32 must have a diameter larger than the electrical connectors which engage the sockets 35 and 36. To prevent air from flowing about the lamps 37, the openings 90 and 91 are closed by cup-shaped members 93 each including a tubular sleeve 94 fixed at an end to the plate 31 (32) and carrying a shallow cup shaped member 95 at the other end. The member 95 has a relatively large opening 96 therein and a washer-like member 97 of high temperature insulating material having an opening therein slidably receiving the lamp neck 37'. The insulating member 97 is held in place by a plate 98 having a large opening 99 therein so that it cannot contact the lamp neck. In this way effective cooling of the sockets 35 and 36 is accomplished and the cooling air cannot flow over and about the lamps 37 and major portions of the lamp necks 37' which would adversely affect the operation thereof.

The washer like members 97 as well as the sealing strips 60, 62, 70 and 73 are preferably formed of a flexible high temperature material. One such material that has been found effective for this purpose is asbestos impregnated with a tetrafluoroethylene resin generally known in the trade as Teflon. Other suitable materials may of course be employed provided however that they will enable the attainment of a good air seal.

While only one embodiment of the invention has been illustrated and described, it is understood that alterations, modifications and changes may be made without departing from the true scope and spirit thereof as defined by the appended claims.

What is claimed is:

1. Ink curing apparatus comprising an ultraviolet lamp having neck portions extending from the ends thereof and carrying electric terminals, reflector means at least partially surrounding said lamp with said neck portions extending from the ends of said reflector, plates closing the ends of said reflector and having openings through which said neck portions extend, said openings being substantially greater in diameter than said necks, closure means including an insulating element surrounding each of said necks to close the last said openings, a housing surrounding said reflector means and means for the circulation of air between said housing and said reflector means for cooling the latter and restricting the flow of air about said lamp, said closure means including a tubular member secured to and extending outwardly from each of said plates with each tubular member being aligned with and surrounding the opening in the associated plate and insulating means secured to the outer end of each tubular member with said neck extending therethrough, said tubular members and insulating means effectively closing the last openings, said housing extending beyond said reflector means to at least partially enclose said necks and terminal means and said air circulating means circulating air about the portions of said necks extending from said closure means together with said terminal means.

* * * * *